United States Patent [19]
Marlow et al.

[11] Patent Number: 4,698,636
[45] Date of Patent: Oct. 6, 1987

[54] GROUND SPEED DETERMINING RADAR SYSTEM

[76] Inventors: Raymond Marlow, Rte. 4, #6 Eastshore Rd., Rockwall, Tex. 75087; John L. Nelson, Jr., 2408 Scorpius, Garland, Tex. 75042

[21] Appl. No.: 602,344

[22] Filed: Apr. 20, 1984

[51] Int. Cl.$^4$ ............................................. G01S 13/60
[52] U.S. Cl. .................................... 342/104; 342/109; 342/6; 342/97
[58] Field of Search ................ 343/5 LS, 18 B, 18 D, 343/8, 9 R, 7.3; 342/104, 109; 364/565

[56] References Cited

U.S. PATENT DOCUMENTS

| | | | |
|---|---|---|---|
| 2,580,921 | 1/1952 | Iams | 342/6 |
| 3,321,757 | 5/1967 | Crow et al. | 342/104 X |
| 4,104,634 | 8/1978 | Gillard et al. | 343/18 C |
| 4,283,725 | 8/1981 | Chisholm | 343/5 LS X |
| 4,594,676 | 6/1986 | Breiholz et al. | 342/109 X |

Primary Examiner—T. H. Tubbesing
Assistant Examiner—John B. Sotomayor

[57] ABSTRACT

A ground speed determining radar system for take off roll and landings and roll out maneuvers has a ground based modulating radar reflector and a carrier based radar. The radar transmits microwave energy to the reflector where it is modulated by rotating spaced reflectors and returned to the radar receiver. The receiver is a heterodyne receiver having a log IF stage and a fast time control (FTC) circuit for attenuating clutter and an acquisition loop circuit, lock-on circuit and tracking loop circuit. The acquisition loop circuit includes a center, gate, modulation bandpass filter, switch, acquisition sweep generator and gate generator; the lock-on circuit adds a delay line and a good data indicator to the loop acquisition circuit, and the track loop circuit includes early/late gates, early/late gate low pass filters, subtractor, integrator, the switch and gate generator. Prior to acquisition or upon loss of lock-on, the modulation band pass filter has zero output to the switch and the switch switches in the acquisition sweep generator and a ramp voltage is applied to the early/late gates. During the time the early/late gates are swept over the desired modulated frequency from the ground reflector the modulated band pass filter outputs a signal to the switch which switches in the integrator of the tracking loop. The lock-on circuit's delay means delays the modulation band pass output a time sufficient for the integrator to settle down and spurious noise to the disappear before activiting the data indicator. At times, the early/late gates are not centered on an echo return; thus more echo energy is in one (late) gate than in the other (early gate), for example. The subtractor outputs the difference to the integrator which output a dc voltage proportional to the range to the reflector. A differentiator and range indicator and the switch are connected to the integrator for receiving its dc output and, respectively, outputting velocity and range information and feed back to center the early/late gates on the echo.

8 Claims, 7 Drawing Figures

U.S. Patent   Oct. 6, 1987   Sheet 1 of 3   4,698,636
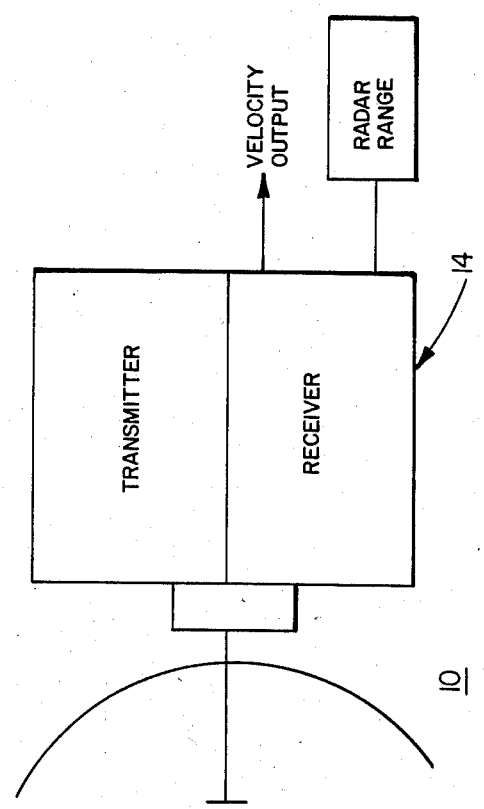
FIG. 1
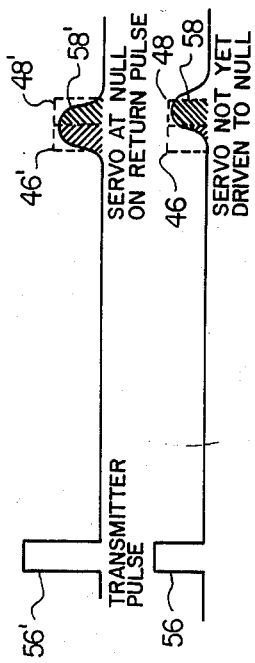
FIG. 5
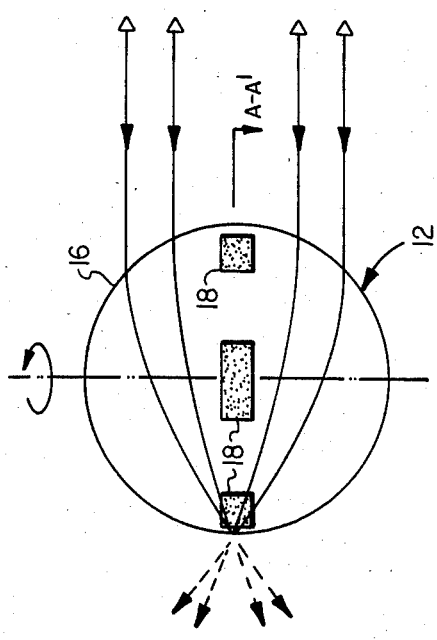
FIG. 2
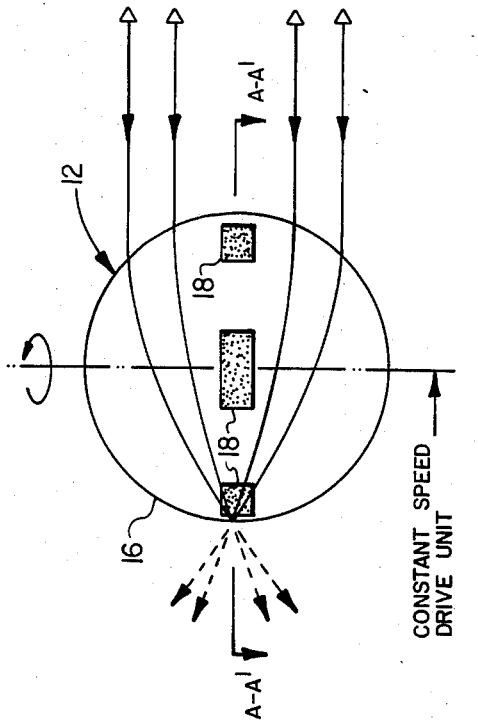

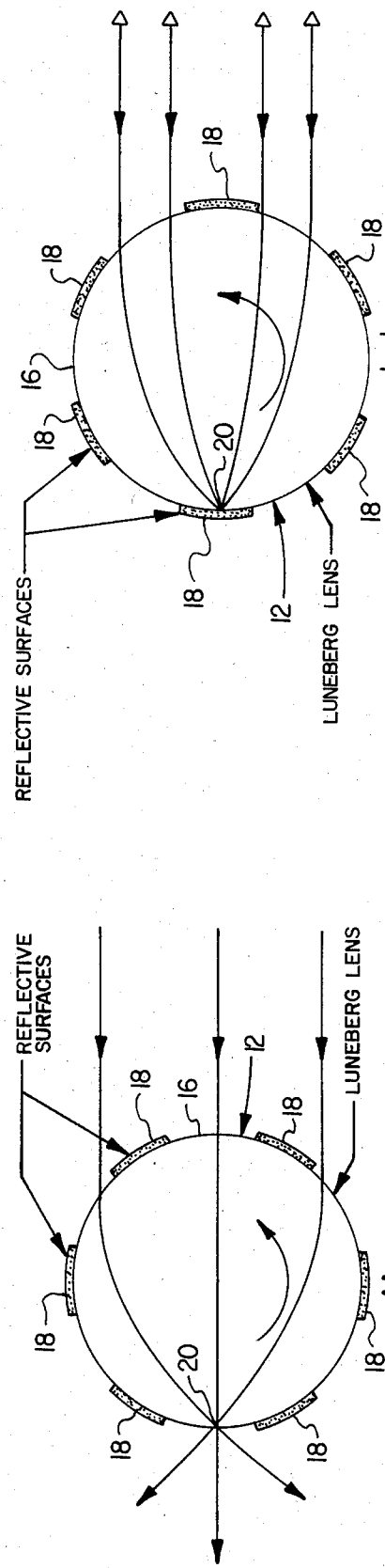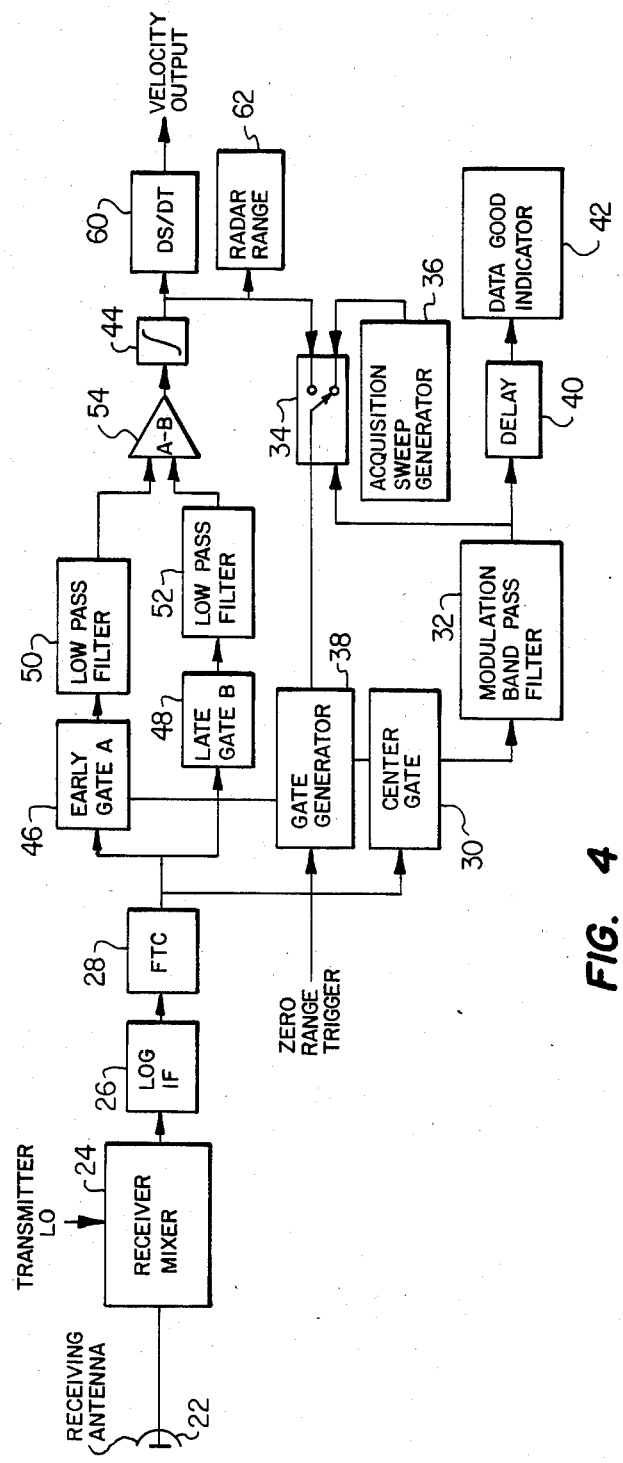
FIG. 3a
FIG. 3b
FIG. 4

GROUND SPEED DETERMINING RADAR SYSTEM

This invention relates to radars and more particularly to a carrier based ground speed determining radar system.

In the past carriers such as aircraft have had no on board mechanism for determining the presence of wind shear (down drafts) during approach to and take off from an airfield. Further, during landing and roll out there has been no on board mechanism for determining accurately the ground speed of the airplane. Aircraft have had to utilize position markers along the runway or wheel rotation counters to determine distance to go and ground speed. Such direct means are not always visible during fog, smoke or other poor weather conditions and are also hazardous to landing and take off operations. Whilst, the use of wheel rotation counters to determine aircraft distance travelled along the runway and ground speed is subject to errors such as, for example, an initialization error owing to uncertainty of the point of touchdown, errors owing to braking and hydroplaning errors.

The use of existing radars to provide ground speed and distance to go measurements are objectionable. For example, weather radars because of their long pulsewidths limit the minimum range to at least 3,000 feet; radio altimeters are required to determine vertical distance until touchdown, operation in a dual mode would require extensive design modification and trade offs to accommodate the dual operation modes, and because of the broad antenna beams used, a considerable level of competing returns would be expected from airport terrain and surrounding buildings; and distance measurement equipment (DME) radars suffer from close-in echoes which occur on final approach and distort the leading edge of either pulse, distortion of the second pulse by echoes from the first can also occur for some combinations of obstructions and range. Those persons skilled in the art will recognize errors other than those mentioned above which preclude the use of the present radars.

Accordingly, it is an object of this invention to provide a radar system capable of performing in heavy rain, snow, low runway visibility and with poor runway traction.

Another object of the invention is to provide a radar system meeting established error requirements.

Still another object of the invention is to provide a radar system providing ground speed service during approach, landing, takeoff and climbout.

Yet another object of the invention is to provide a radar system providing distance and velocity information peculiar to landing and take off operations.

Briefly stated the present invention comprises a radar based ground speed determining system, which, because the response of an aircraft to windshear is dynamic, has a long smoothing time for averaging out the effects of turbulence and a short smoothing time to enable the instrument to follow the speed change induced by rapidly shearing wind.

Other objects and features of the invention will become more readily understood from the following detailed description and appended claims when read in conjunction with the accompanying drawings in which:

FIG. 1, is a block diagram of the radar based ground speed determining system;

FIG. 2 is a plan view of the modulator reflector of the present invention;

FIGS. 3a & 3b are sectional views taken along lines A—A, and A-A$_1$ of FIG. 2 showing the operation of the modulator reflector;

FIG. 4 is a block schematic diagram of a first embodiment of the ground speed/radar range radar;

FIG. 5 is a diagram the relationship of the transmitter pulse and servo response to gating action.

Figure 6:
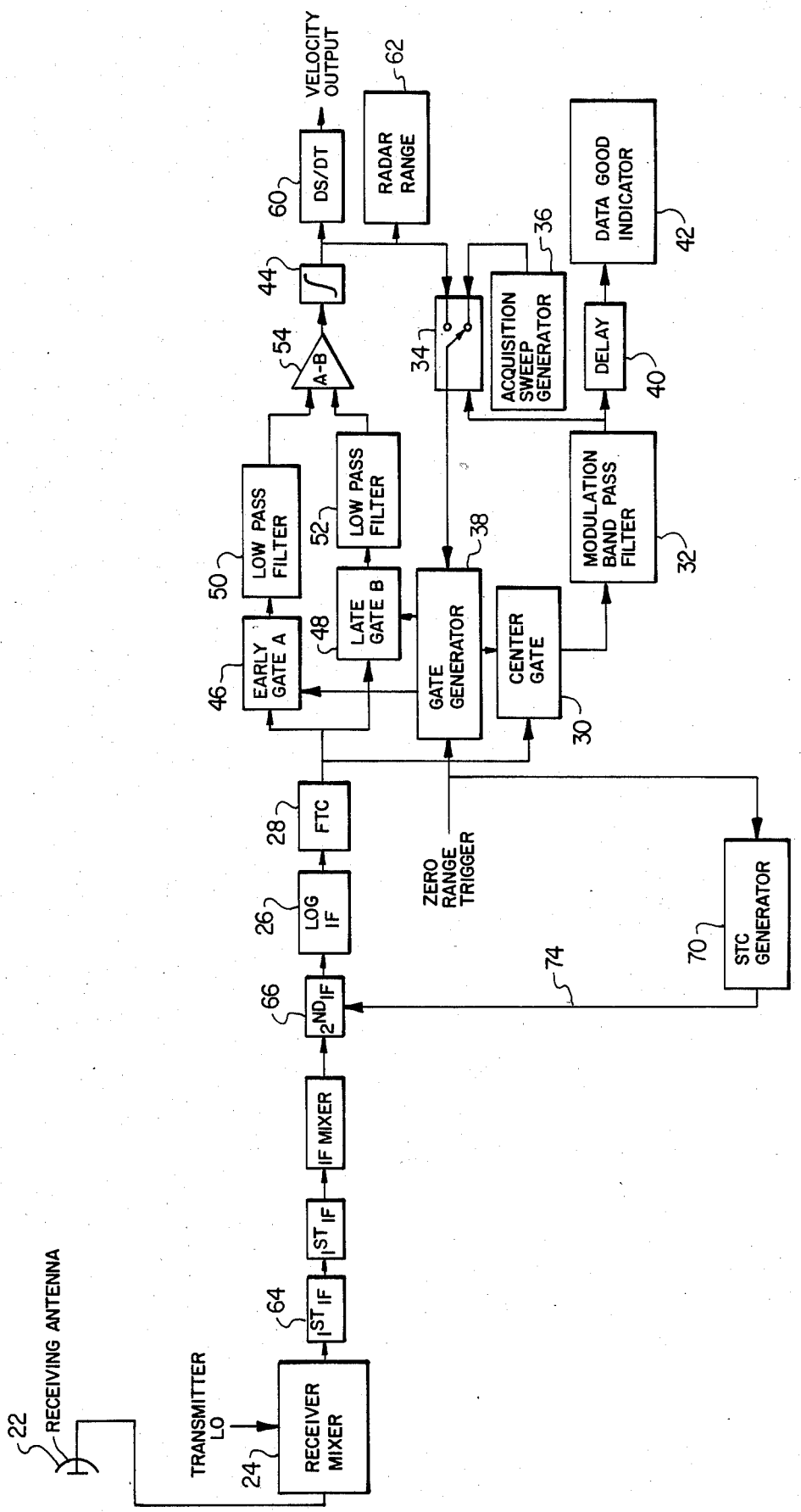
FIG. 6 is a block schematic diagram of a second embodiment of the invention.

Referring now to FIG. 1, the radar based ground speed determining system 10 includes a radar reflector 12 and a radar 14.

The radar reflector 12 (FIG. 2) may be, for example, the reflector disclosed in U.S. Pat. No. 3,295,132 issued Dec. 27, 1966 to Aubrey I. Chapman for a "Modulating Radar Reflector". The reflector 12, for example, comprises a spherical lens 16 having spaced reflecting surfaces 18 around its equator. The lens is mechanically rotated at a preselected speed by an appropriate prime mover. The lens is dynamically balanced to minimize mechanical vibrations. A precision spiral-gear speed reducer is used to provide low-tooth-to-tooth speed variation, and hence low "flutter" of the reflector.

The lens, known as the Luneberg modulator/reflector lens, focuses microwave energy incident on its surface 16 to a small spot 20 (FIG. 3a) on the opposite spherical surface. If no reflective surface 18 is present the energy spills through the lens and is dissipated. However, when a reflecting surface 18 rotates to the spot 20 (FIG. 3b) the energy is reflected in a highly collimated beam directly along the path from which it came. In this manner, incident energy is alternatively reflected to the source (radar) 14 (FIG. 1) or dissipated at a frequency dependent upon the angular arrangement of the reflected surfaces and the rotational speed of the modulator/reflector assembly.

For example, a 30 inch diameter spherical lens 16 having 32 spaced reflecting surfaces around its equator rotated at 360 rpm by a 60 Hz motor through an appropriate speed reducer using line power if available otherwise a gasoline-engine-driver 60 Hz generator produces a theoretical radar cross section of about 5000 square meters. Those persons skilled in the art needing more information concerning the lens are referred to the above-mentioned patent.

A reflector 12 (FIG. 1) is positioned at each end of a runway for reflecting a frequency which can be used by the ground speed determining radar 14 to identify the reflector from surrounding clutter in an aircraft performing landing roll out and take off roll maneuvers.

The carrier based ground speed determining radar 14 is, for example, a pulse radar having a transmitter for transmitting microwave energy to the reflector 12 and a receiver for receiving the modulated returns of the reflector. The receiver is modified to incorporate three major sections; namely, a reflector frequency acquisition section, a lock-on section and a tracking section.

The reflector frequency acquisition section (FIG. 4) comprises, for example, an antenna 22, receiver mixer 24, log IF amplifier 26, a fast time constant (FTC) circuit 28 and the acquisition loop including a center gate 30, modulation bandpass filter 32, switch 34, acquisition sweep generator 36 and gate generator 38.

The lock-on section includes in addition to the elements of the acquisition loop a delay mechanism 40, data good indicator 42 and integrator 44.

The tracking section includes a loop including an early gate 46, late gate 48, low pass filters 50 and 52, forming two channels to difference amplifier (subtractor) 54, integrator 44, switch 34 and gate generator 38.

The receiving antenna 22 (FIG. 4) receives the returning frequency modulated energy from the reflector 12 (FIG. 1). The receiver mixer 24 (FIG. 4) is connected to the receiving antenna 22 and to the local oscillator for receiving, respectively, the radar return energy and a portion of the local oscillator signal which acts as the reference signal required to produce the difference frequency that is the IF signal.

The log IF amplifier (strip) 26 is connected to the receiver mixer 24 for receiving the IF frequency, and the fast time constant (FIC) circuit 28 is connected to the log IF amplifier 20. The log IF amplifier 26 and FTC 28 normalizes the clutter return so that, for all values of clutter return, the clutter video level is essentially constant. The modulated frequency return signal (target) level is proportional to target strength so that for increasing clutter and target levels the ability to more effectively threshold out the clutter return is improved.

The center gate 30 of the acquisition loop is connected to the FTC circuit 28 for receiving the target (video) signals. The modulation band pass filter 37 is connected to the center gate 30 for receiving the video and outputting acquisition or lock-on status indicating signals. The switch 34, which is a solid state switch, is connected to the modulation band pass filter 32 for receiving the acquisition or lock-on status indicating signals and when acquisition or lock-on status signals are zero or below threshold, switch the acquisition sweep generator 36 into the loop.

The gate generator 38 is connected to switch 34 for receiving the ramp voltages from the acquisition sweep generator. The early gate 46, late gate 48 and center gate 30 are connected to the gate generator 38 for receiving the ramping voltage. The early/late gates 46 and 48 are swept from zero range toward full range, but during the time they pass over the desired modulated target (video) the center gate output is such that the modulation band pass filter voltage output exceeds the threshold voltage of switch 34 and the integrator 44 which controls the tracking loop is switched in. To insure proper lock-on, the delay line 40 is connected to the modulation band pass filter 32 for delaying the band pass filter's output sufficiently to ensure that the integrator has settled down and the output of the band pass filter has been stable long enough to contain correct information. The data good indicator 42 is connected to the delay line 40 for receiving the delayed band pass filter's output for signaling valid lock-on; i.e., the values are valid and are not the result of some spurious noise or lock-up condition.

The tracking loop includes the early/late gates 46 and 48 which are connected to the FTC circuit 28 for receiving the modulated video and the gate generator 38 for receiving a zero range trigger signal from the pulse repetition frequency clock and for selectively receiving the output of the acquisition sweep generator for acquisition and lock-on or the feedback output of the integrator 44 for centering the gates. Low pass filters 50 and 52 are connected, respectively, to the early/late gates 46 and 48 for passing the modulated target (video). The differential amplifier 54 (subtractor) is connected to the low pass filters 50 and 52 for receiving the modulated target signals.

The technique for automatically tracking range is based on the split range gate (FIG. 5). A first transmitted pulse 56 is transmitted and sometime later an echo pulse 58 is received. The relative position of the gates 46 and 48 with respect to the echo 56 at a particular instant determines the error. Assuming that the range is changing and the early/late gates 46 and 48 are not centered on the desired target so that there is more energy in the late gate 48 and less energy in the early gate, the subtractor 54 (FIG. 4) output will be some dc voltage level. The integrator 44 is connected to the subtractor 54 for integrating the dc output. The position of the early/late gates 46 and 48 (or the time delay from zero range to the time that the early/late gates (occur) is determined by the dc voltage coming from the integrator, so that voltage is proportional to the range to the target. The dc voltage output is fed back through switch 34 and gate integrator 38 to the early/late gates 46 and 48 to recenter the early/late gates and echo pulse shown in FIG. 5 as early/late gates 46'/48' and return pulse 58'.

With the above tracking mechanism, the early/late gates are maintained on center over the modulated target. Thus, the only video input to the integrator is the video entering during the time of the combined early/late gates, which will be a period approximately equal to the transmitted pulsewidth.

A differentiator 60 and a radar range indicator 62 are also connected to the integrator 44 for receiving the dc output which is proportional to distance. The differentiator 60 produces an output equal to the desired velocity output. The velocity output of the differentiator is, for example, integrated into the serve-driver command air speed bug on the airspeed indicator to facilitate pilot detection of headwind and tailwind effects by simply noting the position of the bug relative to the airspeed pointer. While the Radar range indicator 62 uses the velocity indicating dc to compute and display the range to the reflector.

In a second embodiment (FIG. 6), the radar includes a superheterodyne type receiver having first and second IF stages 64 and 66 connected in cascade between the receiver mixer 24 and log IF strip 26. A sensitivity time control (STC) generator 70 is connected by lead 72 to the zero range trigger input for receiving the pulse repetition frequency clock. The second IF stage is connected by lead 74 to the STC generator 70 for gain control as a function of time. By reducing the gain at close ranges, the clutter signal is attenuated and the FTC action enhanced.

Although several embodiments of the invention have been illustrated and described, it will be obvious to those persons skilled in the art that changes and modifications can be made without departing from the scope of the invention.

We claim:

1. A ground speed and distance-to-go measuring system comprising:

a carrier based radar and at least one radar code modulating reflector for positioning selectively at or near ends of a runway, said radar having a transmitter for transmitting microwave energy to the radar modulating reflector for generating a coded modulated reflector return signal, and a receiver for receiving the coded modulated return signal, said receiver responsive to the coded return signal for producing a long smoothing time for averaging out the effects of turbulence and a short smoothing time for enabling the system to follow the speed change induced by rapidly shearing wind.

2. A radar for use in a ground speed determining system comprising:
   a transmitter means for transmitting microwave energy to a modulating reflector;
   a receiver means for receiving the return energy, said receiver means including a clutter noise alternating means; and
   a reflector return energy acquisition loop circuit, a reflector tracking loop circuit, and a velocity determining means, said acquisition loop circuit and tracking loop circuit operatively connected to the receiver and coacting to determine acquisition of the reflector return energy and to provide from the reflector return energy reflector range information and said velocity determining means operatively connected to receive the range information and determining ground speed.

3. A radar for use in a ground speed determining system comprising:
   a transmitter means for transmitting microwave energy to a modulating reflector;
   a receiver means for receiving the return energy;
   a reflector return energy acquisition loop circuit, said acquisition loop circuit including a center gate means, a modulation band pass filter means, switching means, acquisition sweep generator means and gate generator means, said switching means operatively connected to a tracking loop acquisition sweep generator means, modulation band pass filter, and gate generator means for selectively connecting the output of the tracking loop for feedback and the output of the acquisition sweep generator means to the gate generator means in response to the output of the modulation band pass filter, said generator means operatively connected to the tracking loop and center gate means for generating gate signals from the input of the switching means for the tracking loop and the center gate means, said, center gate means operatively connected to the receiver and gate generator for outputting the return energy, said modulation band pass filter operatively connected to the center gate for receiving the return energy and selectively indicating the presence and absence of the reflector return energy whereby said switching means inputs the output of the acquisition sweep generator until acquisition of the reflector return energy and the feedback output of the tracking loop during acquisition;
   a reflector tracking loop circuit and a velocity determining means, said acquisition loop circuit and tracking loop circuit operatively connected to the receiver and coacting to determine acquisition of the reflector return energy and to provide from the reflector return energy reflector range information and said velocity determining means operatively connected to receive the range information and determining ground speed.

4. A radar for use in a ground speed determining system comprising:
   a transmitter means for transmitting microwave energy to a modulating reflector;
   a receiver means for receiving the return energy;
   a reflector return energy acquisition loop circuit;
   a reflector tracking circuit and a velocity determining means, said tracking loop including an early gate means, a late gate means, an early gate loop pass filter means, a late gate low pass filter means, a subtractor means, an integrator means, a switching means, and a gate generator means, said switching means operatively connected to the integrator means, acquisition loop, and generator means for selectively connecting the feedback output of the integrator means and the acquisition signal output of the acquisition loop to the gate generator, said early and late gate means operatively connected to the receiver and gate generator means for selectively receiving the acquisition signal output for reflector return energy acquisition and integrator means feedback output and the return energy for centering the received reflector return energy in the early/late gates, said early gate and late gate low pass filter means operatively connected, respectively, to the early gate means and late gate means and passing the reflector return energy signals representative of the reflector return energy in each gate, said subtractor means operatively connected to the early gate and late gate filters for subtracting the received return energy signals and outputting a difference signal and said integrator means operatively connected to the subtractor means for integrating the received difference signals and outputting signals proportional to the range to reflector for feedback to the early/late gates and differentiating means whereby the output of the differentiating means represent the ground speed, said acquisition loop circuit and tacking loop circuit operatively connected to the receiver and coacting to determine acquisition of the reflector return energy and to provide from the reflector return energy reflector range information and said velocity determining means operatively connected to receive the range information and determining ground speed.

5. A radar for use in a ground speed determining system comprising:
   a transmitter means for transmitting microwave energy to a modulating reflector;
   a receiver means for receiving the return energy;
   a reflector return energy acquisition loop circuit;
   a reflector tracking loop circuit and a velocity determining means, said reflector return energy acquisition loop and reflector tracking loop including early, late, and center gates operatively connected to the receiver for receiving return energy, a gate generator means operatively connected to the early, late, and center gates, low pass filters operatively connected to the early/late gates for filtering the return energy and passing reflector return energy, a subtractor operatively connected to the low pass filters for receiving the reflector return energy signals and outputting difference signals, an integrator operatively connected to the subtractor for integrating the difference signals, a switching means having one first terminal connected to the integrator for receiving the output of the integrator as a feedback signal, an acquisition sweep generator operatively connected to a second terminal of the switch for generating frequencies having a range including the reflector return energy, a modulation band pass filter operatively connected to the center gate for receiving the return energy and gate generator output and selectively passing the reflector return energy to said switch for selectively switching the output of the integrator and acquisiton sweep generator to the gate generator whereby the reflector return energy has not been acquired, the acquisition sweep generator output is connected to the acquisition loop for reflector return energy acquisition and after acquisition the integrator output is fedback through the tracking loop and the output of the integrator is proportioned to range, said acquisition loop circuit and tracking loop circuit operatively connected to the receiver and coacting to determine acquisition of the reflector return energy and to provide from the reflector return energy reflector range information and said velocity determining means operatively connected to receive the range information and determining ground speed.

6. A radar for use in a ground speed determining system comprising:
   a transmitter means for transmitting microwave energy to a modulating reflector;
   a receiver means for receiving the return energy, said receiver means including a clutter noise attenuator means having a log IF amplifier and a fast time constant circuit operatively connected for receiving the return energy and attenuating clutter noise for the reflector return energy acquisition loop and the reflector tracking loop and wherein the receiver means has one or more intermediate frequency stages and a sensitivity time control circuit operatively connected to one of the intermediate frequency stages;
   a reflector tracking loop circuit and a velocity determining means, said acquisition loop circuit and tracking loop circuit operatively connected to the receiver and coacting to determine acquisition of the reflector return energy and to provide from the reflector return energy reflector range information and said velocity determining means operatively connected to receive the range information and determining ground speed.

7. A radar for use in a ground speed determining system comprising:
   a transmitter means for transmitting microwave energy to a modulating reflector;
   a receiver means for receiving the return energy;
   a reflector return energy acquisition loop circuit;
   a reflector tracking loop circuit and a velocity determining means;
   said acquisition loop circuit and tracking loop circuit operatively connected to the receiver and coacting to determine acquisition of the reflector return energy and to provide from the reflector return energy reflector range information and said velocity determining means operatively connected to receive the range information and determining ground speed, wherein the reflector return energy acquisition loop and reflector tracking loop comprise early, late and center gates operatively connected to the receiver for receiving return energy, a gate generator means operatively connected to the early, late, and center gates, low pass filters operatively connected to the early/late gates for filtering the return energy and passing reflector return energy, a subtractor operatively connected to the low pass filters for receiving the reflector return energy signals and outputting difference signals, an integrator operatively connected to the subtractor for integrating the difference signals, a switching means having one first terminal connected to the integrator for receiving the output of the integrator as a feedback signal, an acquisition sweep generator operatively connected to a second terminal of the switch for generating frequencies having a range including the reflector return energy, a modulation band pass filter operatively connected to the center gate for receiving the return energy and gate generator output and selectively passing the reflector return energy to said switch for selectively switching the outputs of the integrator and acquisition sweep generator to the gate generator, whereby when the reflector return energy has not been acquired the acquisition sweep generator output is connected to the acquisition loop for reflector return energy acquisition and after acquisition the integrator output is fedback through the tracking loop and the output of the integrator is proportioned to range, and wherein the gate generator is further connected to a zero range trigger generating means and a radar range means is connected to the integrator means for receiving the output proportional to the range to the reflector and indicating the range to the reflector.

8. A radar for use in a ground speed determining system comprising:
   a transmitter means for transmitting microwave energy to a modulating reflector;
   a receiver means for receiving the return energy;
   a reflector return energy acquisition loop circuit;
   a reflector tracking loop circuit; and
   a velocity determining means;
   said acquisition loop circuit and tracking loop circuit operatively connected to the receiver and coacting to determine acquisition of the reflector return energy and to provide from the reflector return energy reflector range information, and said velocity determining means operatively connected to the range information and determining ground speed, wherein the reflector return energy acquisition loop and reflector tracking loop comprise early, late, and center gates operatively connected to the receiver for receiving return energy, a gate generator means operatively connected to the early, late and center gates, low pass filters operatively connected to the early/late gates for filtering the return energy and passing reflector return energy, a subtractor operatively connected to the low pass filters for receiving the reflector return energy signals and outputting difference signals, an integrator operatively connected to the subtractor for integrating the difference signal, a switching means having a first terminal connected to the integrator for receiving the output of the integrator as a feedback signal, an acquisition sweep generator operatively connected to a second terminal of the switch for generating frequencies having a range including the reflector return energy, a modulation band pass filter operatively connected to the center gate for receiving the return energy and gate generator output and selectively passing the reflector return energy to said switch for selectively switching the outputs of the integrator and acquisition sweep generator to the gate generator;
   said modulation bandpass filler further including a reflector return energy lock on indicating circuit, said lock-on indicating circuit including a signal delay means operatively connected to the modulation band pass filter for delaying the output a time sufficient for integrator and differentiator operation settlement and conflicting spurious noise detection and a data good indicator operatively connected to the delay means for receiving valid lock-on indicating signals whereby when the reflector return energy has not been acquired the acquisition sweep generator output is connected to the acquisition loop for reflector return energy acquisition and after acquisition the integrator output is fedback through the tracking loop and the output of the integrator is proportioned to range.

* * * * *